United States Patent [19]

Title

[11] Patent Number: 4,733,926
[45] Date of Patent: Mar. 29, 1988

[54] INFRARED POLARIZING BEAMSPLITTER

[75] Inventor: Alan Title, Palo Alto, Calif.

[73] Assignee: Lockheed Missiles & Space Company, Inc., Sunnyvale, Calif.

[21] Appl. No.: 929,114

[22] Filed: Nov. 10, 1986

[51] Int. Cl.$^4$ .............................................. G02B 5/30
[52] U.S. Cl. ................................... 350/1.1; 350/395
[58] Field of Search ............... 350/1.1, 395, 394, 400, 350/401, 402, 403, 169, 170, 173, 1.6, 1.7, 370, 166

[56] References Cited

U.S. PATENT DOCUMENTS 4,229,066 10/1980 Rancourt et al. .................... 350/1.6
4,627,688 12/1986 Kobayashi et al. ................. 350/173

Primary Examiner—Bruce Y. Arnold
Assistant Examiner—Jay P. Ryan
Attorney, Agent, or Firm—John J. Morrissey

[57] ABSTRACT

A polarizing cube beamsplitter, which is designed for infrared applications, comprises two 45° prisms made of ZnSe. A first anti-reflection layer, which is a Herpin equivalent layer consisting of the triad of sublayers ZnS-ZnSe-Zns, is deposited onto the hypotenuse of a first one of the prisms. Then, a polarizing stack consisting of a plurality of pairs of thin-film layers of alternating high and low refractive indices is formed on the first anti-reflection layer. One layer in each pair of thin-film layers in the polarizing stack is a Herpin equivalent layer consisting of the triad of sub-layers Te-ZnSe-Te, and the other layer in each pair is a thin film of ZnSe. A layer of prism material ZnSe, which is thick enough to be optically polished, is then formed on the second anti-reflection layer. The hypotenuse of the second prism is likewise optically polished, and is pressed onto the optically polished layer of prism material to form a bond. The resulting beamsplitter is of cubic configuration.

25 Claims, 2 Drawing Figures

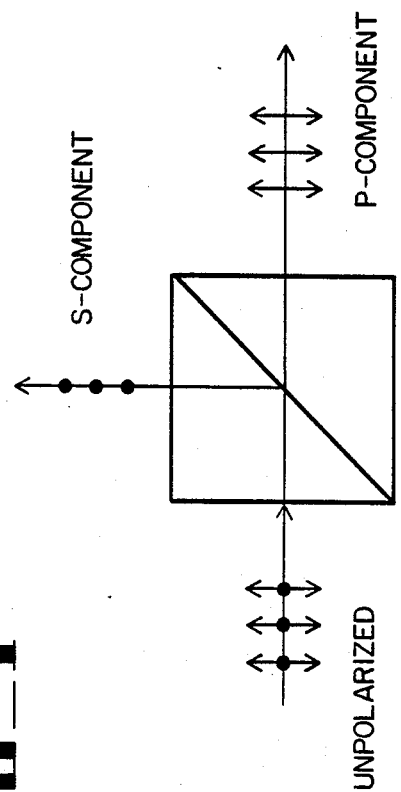
FIG_1
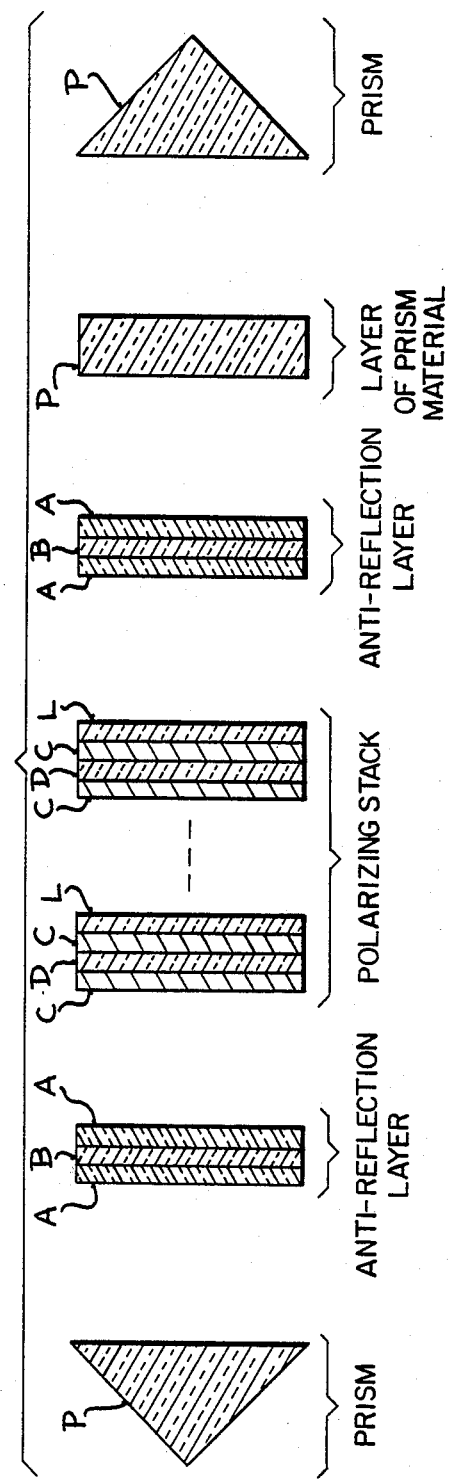
FIG_2

INFRARED POLARIZING BEAMSPLITTER

The Government has rights in this invention pursuant to Contract F33615-80-C-5017 awarded by the Department of the Air Force.

TECHNICAL FIELD

This invention pertains generally to broadband polarizing beamsplitters, and more particularly to the fabrication of polarizing cube beamsplitters for use in the infrared region of the optical spectrum.

BACKGROUND

Polarizing beamsplitters were first described by Mary Banning in "Practical Methods of Making and Using Multilayer Filters", *J. Opt. Soc. Amer.*, Vol. 37, pages 792-797, (1947), who constructed a polarizing beamsplitter by coating successive layers of two different thin-film materials having alternately high and low indices of refraction upon the hypotenuse of a first 45° prism, and by cementing the hypotenuse of an identically dimensioned second 45° prism to the coated hypotenuse of the first prism to form a cube. The refractive index $n_0$ of the prisms, and the refractive indices $n_1$ and $n_2$ of the thin-film materials, were selected by Banning in accordance with Brewster's condition so that the p-component (i.e., the time-varying component of the electric vector parallel to the plane of incidence) of an optical beam incident upon a side of the cube formed by the prisms is transmitted through the successive thin-film layers between the prisms without undergoing substantial deviation at the interfaces between the successive thin-film layers. The thickness of the coating of thin-film layers was selected by Banning so that the s-component (i.e., the time varying component of the electric vector perpendicular to the plane of incidence) of the optical beam incident upon the side of the cube is partially reflected from each of the successive thin-film layers.

When a cube beamsplitter according to Banning's design is positioned in an optical beam in such a way that a side of the cube (i.e., a side of the first prism) is perpendicular to the beam, the beam (after passing through the first prism) is incident upon the interface between the first prism and the first thin-film layer (i.e., upon the hypotenuse of the first prism) at an angle of incidence equal to the prism angle $\theta_0$, which is specified to be 45°. The relationship between the angle of the beam in the first prism to the angle of the beam in the first thin-film layer is given by Snell's law as:

$$n_0 \sin \theta_0 = n_1 \sin \theta_1 \quad (1)$$

where $\theta_0$ and $\theta_1$ are the angles of the beam in the first prism and in the first thin-film layer, respectively, relative to the normal to the interface between the first prism and the first thin-film layer. The condition for non-deviation of the p-component of the beam in passing from the first thin-film layer into the second thin-film layer is given by Brewster's law as:

$$\frac{n_1}{\cos \theta_1} = \frac{n_2}{\cos \theta_2} \quad (2)$$

where $\theta_2$ is the angle of the beam in the second thin-film layer relative to the normal to the interface between the first thin-film layer and the second thin-film layer (which is substantially the same as the normal to the interface between the first prism and the first thin-film layer). The angles $\theta_1$ and $\theta_2$ are completely independent of the order of the successive thin-film layers coated over the hypotenuse of the first prism, and are also completely independent of the thicknesses of the thin-film layers.

Combining equations (1) and (2) gives the relationship between the refractive indices $n_0$, $n_1$ and $n_2$ as:

$$n_0^2 \sin^2 \theta_0 = \frac{n_1^2 n_2^2}{n_1^2 + n_2^2} \quad (3)$$

as the condition for non-deviation and non-reflection of the p-component of the incident beam in passing through the succession of thin-film layers having alternating high and low indices of refraction $n_1$ and $n_2$.

The reflection of the s-component of the incident beam from the successive first and second thin-film layers is greatest when each of the layers has an optical thickness of one-quarter wavelength for the particular wavelength $\lambda_0$ for which the beamsplitter is designed (typically, a wavelength at the center of the operating range of the system in which the beamsplitter is to be used). Thus, for maximum reflection of the s-component, the thickness $d_1$ of the first thin-film is given by:

$$d_1 = \frac{\pi}{4} \frac{\lambda_0}{n_1 \cos \theta_1} \quad (4)$$

and the thickness $d_2$ of the second thin-film layer is given by:

$$d_2 = \frac{\pi}{4} \frac{\lambda_0}{n_2 \cos \theta_2} \quad (5)$$

When the conditions set by equations (4) and (5) are satisfied, the reflectivity $R_I$ at the interface between the first and second thin-film layers (regardless of whether the beam is being propagated from the first layer into the second layer, or vice versa) can be derived from Maxwell's equations as:

$$R = \left[ \frac{\frac{n_1}{\cos\theta_1} - \frac{n_2}{\cos\theta_2}}{\frac{n_1}{\cos\theta_1} + \frac{n_2}{\cos\theta_2}} \right]^2 \quad (6)$$

If the coating of thin-film layers on the hypotenuse of the first prism comprises k successive pairs of layers of materials having refractive indices $n_1$ and $n_2$, and a final single layer of the material having refractive index $n_1$; and if every one of the layers in the coating satisfies the conditions set by equations (1) and (2), as appropriate; then any desired amount of reflectivity of the s-component of the incident beam can be achieved by using a sufficient number of pairs of thin-film layers. To a good approximation, the reflectivity of the s-component is given by:

$$R = 1 - 4 \left( \frac{n_1}{n_2} \right)^{2k} \frac{n_0}{n_2^2} \quad (7)$$

where $n_1 > n_2$.

In the beamsplitter design of Banning for which the prism angle is 45°, the p-component is transmitted through the first prism into and through the successive thin-film layers into the second prism, from which the p-component emerges as a polarized beam collinear with respect to the incident beam. The s-component is transmitted by a beamsplitter according to Banning's design through the first prism into the successive thin-film layers, and is partially reflected from each of the successive thin-film layers back into the first prism so as to emerge from the first prism as a polarized beam having a direction of propagation perpendicular to the incident beam.

In the beamsplitter design of Banning, reflections of the p-component occur at the interface between the first prism and the first thin-film layer of the coating, and at the interface between the final thin-film layer and the second prism. These p-component reflections "contaminate" the reflected s-component. However, for visible wavelengths, the p-component reflections are relatively small and can ordinarily be ignored. For infrared wavelengths, on the other hand, the indices of refraction of the thin-film materials are quite high, and consequently the reflectivity of the p-component is high and the p-component reflections generally cannot be ignored.

In the prior art, the fabrication of a cube beamsplitter for visible wavelengths conventionally involved bonding a surface of a first prism to a surface of a second prism using an optical cement having the same (or approximately the same) index of refraction $n_O$ as the prism material. However, for infrared wavelengths, an optical cement cannot be used in bonding two prisms together, because there are no optical cements presently available that are sufficiently transparent in the infrared region of the electromagnetic spectrum to transmit a p-component of useful intensity from the first prism into the second prism. Furthermore, there are no optical materials readily available at the present time that can be used in combination to satisfy the condition set by equation (3) for non-deviation and non-reflection of the p-component through successive thin-film layers of alternating high and low indices of refraction.

SUMMARY OF THE INVENTION

It is an object of the present invention to provide a technique for fabricating a polarizing cube beamsplitter, particularly for infrared wavelengths, using only three different kinds of optical materials, which can be selected from a wide range of available optical materials.

A polarizing cube beamsplitter according to the preferred embodiment of the present invention comprises a pair of 45° prisms, which have substantially identical dimensions as determined by the requirements of the particular system in which the beamsplitter is to be used. Both of the prisms comprising the beamsplitter are made from the same optical material, which is selected for its ability to transmit radiation in the particular wavelength region of interest. Most optical materials that transmit in the far infrared region of the electromagnetic spectrum do not transmit in the visible region. However, zinc selenide (ZnSe) crystal is a notable exception. ZnSe crystal has thermal and mechanical properties that are generally compatible with operational requirements of prisms in typical beamsplitter applications at visible wavelengths (e.g., applications for which a material such as BK7 optical glass marketed by Schott Optical Glass Inc. of Duryea, Pa. would be suitable), and is also substantially transparent at infrared wavelengths. Thus, for the preferred embodiment of the present invention, the two prisms comprising the polarizing cube beamsplitter are made of ZnSe crystal.

A pair of thin-film layers having refractive indices $n_1$ and $n_2$, respectively, must be formed on the hypotenuse of one of the prisms in order to obtain transmission of the p-component and reflection of the s-component at the hypotenuse for an unpolarized beam entering the prism so as to be internally incident upon the hypotenuse. When the prism angle $\theta_0$ and the index of refraction $n_0$ for the prism are specified, the possible values for the indices of refraction $n_1$ and $n_2$ of the two thin-film layers are restricted to those for which equation (3) is satisfied so that non-deviation and non-reflection of the p-component of the incident beam can be achieved. For most applications, the prism angle is specified as $\theta_0 = 45°$, so that the s-component can be reflected in a direction orthogonal to the direction of transmission of the p-component. For ZnSe crystal, the refractive index is $n_0 = 2.4$ at $\lambda_0 = 10.6$ microns (in the far infrared region of the spectrum). Unfortunately, for $\theta_0 = 45°$ and $n_0 = 2.4$, pairs of thin-film materials having indices of refraction $n_1$ and $n_2$ that satisfy equation (3) are not generally available.

A technique developed by A. Herpin has been used in the prior art to synthesize an "equivalent layer", which can be used in place of a thin-film layer having a desired refractive index and a desired optical thickness. The Herpin technique was described by L. I. Epstein in "The Design of Optical Filters", *J. Opt. Soc. Amer.*, Vol. 42, pages 806–810, (1952). An equivalent layer synthesized by the Herpin technique (also called a Herpin layer) consists of three sequential sub-layers of the triad form ABA, where A represents a sub-layer of refractive index $n_A$ and thickness $d_A$, and where B represents a sub-layer of refractive index $n_B$ and thickness $d_B$. Using the Herpin technique, it is possible to achieve any desired "equivalent refractive index" $n_E$ between the values of $n_A$ and $n_B$ for any particular wavelength $\lambda_0$.

The condition that must be satisfied to achieve the desired equivalent refractive index $n_E$ for a Herpin layer is that:

$$n_E = n_A \left[ \frac{x-y}{x+y} \right]^{\frac{1}{2}} \quad (8)$$

where:

$$x = \sin 2t_A \cos t_B + \frac{1}{2}\left( \frac{n_A}{n_B} + \frac{n_B}{n_A} \right) \cos 2t_A \cos t_B$$

$$y = \frac{1}{2}\left( \frac{n_A}{n_B} - \frac{n_B}{n_A} \right) \sin t_B$$

and where:

$$t_A = \frac{2\pi}{\lambda_0} n_A d_A$$

$$t_B = \frac{2\pi}{\lambda_0} n_B d_B$$

for $n_0 > n_E > n_B$.

The condition that must be satisfied to achieve the desired optical thickness $d_E$ for a Herpin layer is that:

$$d_E = \cos^{-1}\left[\cos 2t_A \cos t_B - \left(\frac{n_A}{n_B} - \frac{n_B}{n_A}\right)\sin 2t_A \sin t_B\right]. \quad (9)$$

The Herpin technique can be used to design equivalent layers for all angles of incidence. However, for non-normal incidence, equivalent refractive indices of a Herpin layer are different for the s-component and the p-component of an incident beam at a given wavelength $\lambda_0$, and are not related to each other as simply as are the refractive indices of a single thin-film layer for the s-component and the p-component of the same beam at the same wavelength for the same angle of incidence. Furthermore, for non-normal incidence, the optical thickness of a Herpin layer is not the same for the s-component and the p-component.

The equivalent refractive index $n_{Ep}$ of a Herpin layer for the p-component of an incident beam is given by:

$$n_{Ep} = \left[\frac{x_p - y_p}{x_p + y_p}\right]^{\frac{1}{2}} \frac{n_A}{\cos\theta_A} \quad (10)$$

where $\theta_A$ is the angle of the beam in the A sub-layer relative to the normal to the interface between the first prism and the A sub-layer, where:

$x_p = \sin 2t_A \cos t_B + A_p \cos 2t_A \cos t_B$
$y_p = B_p \sin t_B$
where:

$$A_p = \frac{1}{2}\left(\frac{n_A}{n_B}\frac{\cos\theta_B}{\cos\theta_A} + \frac{n_B}{n_A}\frac{\cos\theta_A}{\cos\theta_B}\right)$$

$$B_p = \frac{1}{2}\left(\frac{n_A}{n_B}\frac{\cos\theta_B}{\cos\theta_A} - \frac{n_B}{n_A}\frac{\cos\theta_A}{\cos\theta_B}\right)$$

and where:

$$t_A = \frac{2\pi}{\lambda_0} n_A d_A \cos\theta_A$$

$$t_B = \frac{2\pi}{\lambda_0} n_B d_B \cos\theta_B$$

where $\theta_B$ is the angle of the beam in the B sub-layer relative to the normal to the interface between the A sub-layer and the B sub-layer.

The optical thickness $d_{Ep}$ of the Herpin layer for the p-component of the incident beam is given by:

$$d_{Ep} = \cos^{-1}[\cos 2t_A \cos t_B - A_p \sin 2t_A \sin t_B]. \quad (11)$$

The equivalent refractive index $n_{Es}$ of a Herpin layer for the s-component of an incident beam is given by:

$$n_{Es} = \left[\frac{x_s - y_s}{x_s + y_s}\right]^{\frac{1}{2}} n_A \cos\theta_A \quad (12)$$

where:
$x_s = \sin 2t_A \cos t_B + \frac{1}{2} A_s \cos 2t_A \cos t_B$
$y_s = B_s \sin t_B$
and where:

$$A_s = \frac{1}{2}\left(\frac{n_A \cos\theta_A}{n_B \cos\theta_B} + \frac{n_B \cos\theta_B}{n_A \cos\theta_A}\right)$$

$$B_s = \frac{1}{2}\left(\frac{n_A \cos\theta_A}{n_B \cos\theta_B} - \frac{n_B \cos\theta_B}{n_A \cos\theta_A}\right).$$

The optical thickness $d_{Es}$ of the Herpin layer for the s-component of the incident beam is given by:

$$d_{Es} = \cos^{-1}[\cos 2t_A \cos t_B - A_s \sin 2t_A \sin t_B]. \quad (12)$$

When sub-layers A and B having refractive indices $n_A$ and $n_B$, respectively, are deposited in succession on a prism of angle $\theta_0$ and refractive index $n_0$, the angles $\theta_A$ and $\theta_B$ must satisfy the conditions that:

$$\theta_A = \sin^{-1}\left[\frac{n_0 \sin\theta_0}{n_A}\right] \quad (13)$$

and $$\theta_B = \sin^{-1}\left[\frac{n_0 \sin\theta_0}{n_B}\right]. \quad (14)$$

The Herpin technique can be used to overcome the difficulty presented by the fact that a pair of thin-film materials having refractive indices $n_1$, and $n_2$ that satisfy equation (3) cannot generally be found from among available materials. In accordance with the present invention, one of the thin-film layers formed on the hypotenuse of one of the prisms is a Herpin layer. The equivalent refractive index of the Herpin layer with respect to the p-component of the incident beam is tailored so that the refractive indices of the Herpin layer and a selected material comprising the "other" thin-film layer of the pair with respect to the p-component of the incident beam together satisfy equation (3).

A polarizing beamsplitter according to the present invention transmits the p-component and reflects the s-component of an unpolarized beam internally incident upon the hypotenuse of the prism on which the pair of thin-film layers described above is formed. In order to prevent deviation or reflection of the p-component when passing from the Herpin layer into the "other" thin-film layer, it is necessary that the equivalent index of refraction of the Herpin layer with respect to the p-component (designated as $n_{1p}$) have the same value as the index of refraction of the "other" layer with respect to the p-component (designated as $n_{2p}$), i.e., that $n_{1p} = n_{2p}$. However, in order to insure that the s-component is at least partially reflected when passing from the Herpin layer into the "other" thin-film layer, it is necessary that the equivalent index of refraction of the Herpin layer with respect to the s-component (designated as $n_{1s}$) be different from the index of refraction of the "other" layer with respect to the s-component (designated as $n_{2s}$), i.e., that $n_{1s} \neq n_{2s}$.

In order to reflect a useful amount of the s-component of the beam at the hypotenuse of the prism, a stack comprising a number k of successive pairs of thin-film layers (where each pair comprises a Herpin layer of equivalent-refractive index $n_1$ and layer of a selected material of refractive index $n_1$) is used instead of merely a single pair of thin-film layers. Each pair of thin-film layers reflects a portion of the s-component of the unpolarized beam incident thereon in accordance with equation (6). The effect of providing a stack of such pairs of thin-film layers (called a "polarizing stack") is to increase the total reflectivity additively in substantially direct proportion to the number of pairs of thin-film layers in the stack.

It is usually desirable to use as few different kinds of materials as possible in designing the refractive elements of an optical system. Consequently, it is advantageous for the material that is selected as the "other" thin-film layer of each pair of thin-film layers in the polarizing stack to be the same as the material from which the prisms are made. In accordance with the preferred embodiment of the present invention, not only is the material that is selected for the "other" thin-film layer the same as the prism material, but also one of the sub-layers in the triad comprising the Herpin layer of each pair of thin-film layers in the polarizing stack is made of the same material as the prisms. In the preferred embodiment of the present invention, where the prisms are made of ZnSe, the Herpin layer in each pair of thin-film layers comprises a thin-film sub-layer of tellurium (Te), followed by a thin-film sub-layer of ZnSe (which is the same as the prism material), followed by a thin-film sub-layer of Te. The "other" layer in the pair is a thin-film layer of ZnSe.

In order to prevent contamination of the s-component reflections with the p-component reflections, it is necessary in infrared applications to interpose an anti-reflection layer (called an AR layer) between the first prism and the first pair of thin-film layers in the polarizing stack. It is also necessary to interpose an AR layer between the last pair of thin-film layers in the polarizing stack and the second prism. An AR layer between the first prism and the first pair of thin-film layers in the polarizing stack is also desirable (if not strictly necessary) in many visible applications in order to achieve high-quality reflected s-components.

The optical thickness of the AR layer is one-quarter wavelength at the design wavelength $\lambda_0$ of the beamsplitter in order to maximize the s-component reflections. In order to minimize the p-component reflections, the refractive index of the AR layer for the p-component (designated as $n_{ARp}$) must be:

$$n_{ARp} = (n_{0p} n_{1p})^{\frac{1}{2}} \quad (13)$$

where $n_{0p}$ is the refractive index of the prism material, and $n_{1p}$ is the equivalent refractive index of the Herpin layer of the first pair of thin-film layers in the polarizing stack.

In the preferred embodiment of the present invention in which the prism material is ZnSe, which has a refractive index of $n_{0p} = 3.39$ for the p-component, the refractive index of the AR layer for the p-component is required by equation (13) to have the value 3.58. Since a thin-film material having the value $n_{ARp} = 3.58$ is not readily available, an AR coating can be designed by the Herpin technique to have an equivalent refractive index of $n_{ARp} = 3.58$. It has been found that a Herpin layer comprising a thin-film sub-layer ZnS, followed by a thin-film sub-layer of ZnSe, followed by another thin-film sub-layer of ZnS has the required equivalent index of refractive for the p-component when the thicknesses are those required by equation (10).

In fabricating a polarizing beamsplitter according to the preferred embodiment of the present invention, successive sub-layers of the thin-film materials comprising the Herpin AR layer are deposited (as by vapor deposition or sputtering) onto the hypotenuse of the ZnSe prism. Then, successive pairs of thin-film layers comprising the polarizing stack are formed over the Ar layer. (One of the layers in each pair of thin-film layers comprising the polarizing stack is a Herpin layer, which consists of a triad of sub-layers deposited in succession to form an equivalent layer.) Then, a second AR layer is formed over the polarizing stack. Finally, the second prism is bonded to the second AR layer.

The technique used to bond the second prism to the second AR layer in fabricating a cube beamsplitter according to the preferred embodiment of the present invention is of special interest. A relatively thick layer of prism material is deposited (as by vapor deposition or sputtering) onto the final sub-layer comprising the second (equivalent) AR layer. The thickness of the layer of prism material deposited onto the second AR layer is not critical from an optical standpoint, but must be sufficient from a mechanical standpoint to enable the layer of prism material to be optically polished. The surface (i.e., the hypotenuse) of the second prism that is to be bonded to the second AR layer is likewise optically polished. The optically polished surface of the layer of prism material and the optically polished hypotenuse of the second prism are then brought into contact with each other. Van der Wahls forces, which result in a strong attraction between the two optically flat surfaces, provide a bond of sufficient strength to secure the second prism to the second AR layer.

DESCRIPTION OF THE DRAWING

FIG. 1 is a schematic cross-sectional view of a polarizing cube beamsplitter according to the present invention showing transmission of the p-component and reflection of the s-component of an unpolarized beam of optical radiation.

FIG. 2 is an exploded view of the polarizing cube beamsplitter of FIG. 1 showing the thin-film layers interposed between the two prisms comprising the beamsplitter.

BEST MODE OF CARRYING OUT THE INVENTION

A polarizing cube beamsplitter according to the present invention, as illustrated in schematic cross section in FIG. 1, comprises two prisms that are positioned with respect to each other to form a cube. For most applications, it is preferable that the beamsplitter be configured so as to divide an unpolarized optical beam into a p-component and an s-component, which are propagated in directions that are orthogonal to each other. Therefore, in the preferred embodiment of the present invention, the two prisms are 45° prisms fitted together so that the hypotenuse of one prism is adjacent the hypotenuse of the other prism. Both prisms are made from the same optical material, which is selected to be transparent with respect to the wavelength of interest (called the design wavelength $\lambda_0$ of the beamsplitter).

For a polarizing cube beamsplitter that is intended for use in infrared applications, the prisms can be made from any one of a variety of optical glasses or crystals. Therefore, in principle, no limitation is imposed on the material from which the prisms can be made, other than the fundamental requirement that the material be transparent. Furthermore, no limitation on the dimensions of the prisms is imposed by the technique of the present invention for fabricating the beamsplitter. Therefore, a polarizing cube beamsplitter according to the present invention can be fabricated for an optical system of any aperture size.

In FIG. 1, an unpolarized beam of optical radiation, which may have a wavelength in the infrared region of the electromagnetic spectrum, is shown incident upon a side of one prism (designated as the first prism) of the polarizing cube beamsplitter. The unpolarized beam is transmitted through the first prism to the hypotenuse thereof, upon which a coating of successive thin-film layers is desposited in accordance with the present invention. At the coating, the unpolarized beam is shown being divided into a p-component and an s-component. The p-component is shown being transmitted through the coating into and through the other prism (designated as the second prism), and emerging from the beamsplitter with a direction of propagation that is substantially undeviated from the direction of propagation of the incident beam. The s-component is shown being reflected at the coating so as to pass back into the first prism, and to emerge from the first prism with a direction of propagation that is substantially perpendicular to the direction of propagation of the incident beam.

In FIG. 2, the first and second prisms of the beamsplitter are shown separated from each other in an exploded view in which the constituent layers of the coating on the hypotenuse of the first prism are ilustrated schematically. The prisms are made of a material designated as P. A first anti-reflection (AR) layer formed on the hypotenuse of a first one of the prisms is a Herpin equivalent layer comprising sub-layers designated as the triad ABA. A polarizing stack comprising an unspecified number of pairs of layers of alternately high and low indices of refraction is then formed over the first AR layer. One of the layers of each pair in the polarizing stack is a Herpin equivalent layer comprising sub-layers designated as the triad CDC, and the other layer is formed of a material designated as L. A second AR layer, which is also a triad of the materials ABA, is then formed on the polarizing stack. A relatively thick layer of prism material P is then deposited over the second AR layer. The thickness of the layer of prism material is sufficient to permit optical polishing. The hypotenuse of the second prism is likewise optically polished, and is brought into contact with the optically polished surface of the layer of prism material to bond the second prism to the multi-layered coating on the first prism.

In a preferred embodiment of the present invention, which is designed for use in infrared applications, the prism material P is zinc selenide (ZnSe). Each AR layer consists of three successive sub-layers in the form ABA, where A is zinc sulfide (SnS) and B is ZnSe. The Herpin equivalent layer in each pair of layers in the polarizing stack consists of three sub-layers in the form CDC, where C is tellurium (Te) and D is ZnSe. The other layer L in each pair of layers in the polarizing stack is ZnSe. Thus, with reference to FIG. 2, a preferred embodiment of a polarizing cube beamsplitter according to the present invention is structured as follows:

POLARIZING BEAMSPLITTER

| Structure | Material | Refractive Index For $\lambda_o = 10.6\mu$ | Thickness (nanometers) |
|---|---|---|---|
| First 45° prism (P) | P = ZnSe | 3.39 | |
| First AR equivalent layer in triad form (ABA) | A = ZnS | 2.011 | 778 |
| | B = ZnSe | 2.408 | 488 |
| Polarizing stack comprising k pairs of layers of alternately high and low refractive indices, each pair comprising a first equivalent layer in triad format (CDC) and a second layer (L) | A = ZnS | 2.011 | 788 |
| | C = Te | 2.408 | 614 |
| | D = ZnSe | 4.935 | 781 |
| | C = Te | 2.408 | 614 |
| | L = ZnSe | 2.011 | 2337 |
| | . | . | . |
| | . | . | . |
| | . | . | . |
| | C = Te | 2.408 | 614 |
| | D = ZnSe | 4.935 | 781 |
| | C = Te | 2.408 | 614 |
| | L = ZnSe | 2.011 | 2337 |
| Second AR equivalent layer in triad form (ABA) | A = ZnS | 2.011 | 778 |
| | B = ZnSe | 2.408 | 488 |
| | A = ZnS | 2.011 | 788 |
| Layer of prism material (P) | P = ZnSe | 3.39 | 200000 |
| Second 45° prism (P) | P = ZnSe | 3.39 | |

The layers (or sub-layers) listed above are formed by depositing each successive layer upon its preceding layer by a conventional technique, preferably by vapor deposition. The final step of bonding the second prism to the layer of prism material by optically polished contacting obviates the need for using a cement, which would have an undesirable index of refraction.

It has been found that six pairs of layers (i.e., k=6) of alternating high and low index of refraction are sufficient to make a polarizing stack that reflects approximately 99% of the s-component radiation incident thereon. It is a feature of the present invention that as much or as little of the s-component can be reflected as is appropriate for the particular application by selecting the number of pairs of layers used to form the polarizing stack. For the preferred embodiment of the invention, it is recommended that six pairs of layers be used to make the polarizing stack.

A relatively thick layer of prism material is deposited over the last layer of the stack of thin-film layers. In practice, a layer of 200 microns is recommended. This third layer is polished to be optically flat, and the hypotenuse of the second 45° prism is likewise polished to be optically flat. The two optically flat surfaces are then placed in contact with each other to form a bond, whereby the beamsplitter cube is fabricated.

A technique has been described herein for fabricating a polarizing cube beamsplitter according to the present invention using only three different kinds of materials selected from among available optical and thin-film materials. Practitioners skilled in the art, upon perusing the foregoing specification, would be able to fabricate polarizing cube beamsplitters according to the present invention using other materials for application in particular wavelength regions of interest. It should also be recognized that the technique of the present invention could have application in fabricating optical devices having components other than prisms, e.g., parallel flat plates. Thus, the example provided above is illustrative rather than definitive of the invention. The foregoing specification is to be understood as descriptive of the invention, which is more generally defined by the following claims and their equivalents.

I claim:

1. A method of fabricating a polarizing beamsplitter for separating s and p components of an infrared beam, said method comprising the steps of:
   (a) forming a coating on a surface of a first prism, said coating comprising a stack of substantially identical pairs of thin-film layers, each pair of thin-film layers comprising a first layer of relatively high refractive index and a second layer of relatively low refractive index, one of said first and second layers of each pair of thin-film layers being a Herpin equivalent layer consisting of a triad of sub-layers, said Herpin equivalent layer having an equivalent refractive index that is related to the refractive index of the other of said first and second layers so that the p component of said beam is substantially undeviated and unreflected in passing through each pair of thin-film layers, and
   (b) bonding a surface of a second prism to said coating.

2. The method of claim 1 wherein said coating further comprises a first anti-reflection layer formed on said surface of said first prism, the first layer of an initial pair in said stack of substantially identical pairs of thin-film layers being deposited upon said first anti-reflection layer.

3. The method of claim 2 wherein said coating further comprises a second anti-reflection layer, said second anti-reflection layer being formed on the second layer of a final pair in said stack of substantially identical pairs of thin-film layers.

4. The method of claim 3 wherein each of said first and second anti-reflection layers is a Herpin equivalent layer consisting of a triad of sub-layers, said equivalent layer having an equivalent refractive index that is related to the refractive indices of said prism and of said equivalent layer of each of said pairs of thin-film layers in said stack so that reflection of the p component of said beam is minimized.

5. The method of claim 4 wherein said coating further comprises a layer of prism material deposited upon said second anti-reflection layer, said layer of prism material being optically polished, and wherein said surface of said second prism is also optically polished, said surface of said second prism being bonded to said coating by being pressed into contact with said optically polished layer of prism material.

6. The method of claim 5 wherein said first and second prisms are made of ZnSe, each of said first and second anti-reflection layers is a triad of sub-layers comprising ZnS, ZnSe and ZnS in succession, said first layer of each of said pairs of thin-film layers in said stack is a triad of sub-layers comprising Te, ZnSe and Te in succession, and said second layer of each of said pairs of thin-film layers in said stack is made of ZnSe.

7. The method of claim 5 wherein each of said first and second prisms is substantially a 45° prism, said coating is formed on the hypotenuse of said first prism, and the surface of said second prism that is bonded to said coating is the hypotenuse of said second prism.

8. A polarizing beamsplitter for separating s and p components of an infrared beam, said beamsplitter being fabricated by the steps of:
   (a) forming a coating on a surface of a first prism, said coating comprising a stack of substantially identical pairs of thin-film layers, each pair of thin-film layers comprising a first layer of relatively high refractive index and a second layer of relatively low refractive index, one of said first and second layers of each pair of thin-film layers being a Herpin equivalent layer consisting of a triad of sub-layers, said Herpin equivalent layer having an equivalent refractive index that is related to the refractive index of the other of said first and second layers so that the p component of said beam is substantially undeviated and unreflected in passing through said pair of thin-film layers, and
   (b) bonding a surface of a second prism to said coating.

9. The beamsplitter of claim 8 wherein said coating further comprises a first anti-reflection layer formed on said surface of said first prism, the first layer of an initial pair in said stack of substantially identical pairs of thin-film layers being deposited upon said first anti-reflection layer.

10. The beamsplitter of claim 9 wherein said coating further comprises a second anti-reflection layer, said second anti-reflection layer being formed on the second layer of a final pair in said stack of substantially identical pairs of thin-film layers.

11. The beamsplitter of claim 10 wherein each of said first and second anti-reflection layers is a Herpin equivalent layer consisting of a triad of sub-layers, said equivalent layer having an equivalent refractive index that is related to the refractive indices of said prism and of said equivalent layer of each of said pairs of thin-film layers in said stack so that reflection of the p component of said beam is minimized.

12. The beamsplitter of claim 11 wherein said coating further comprises a layer of prism material deposited upon said second anti-reflection layer, said layer of prism material being optically polished, and wherein said surface of said second prism is also optically polished, said surface of said second prism being bonded to said coating by being pressed into contact with said optically polished layer of prism material.

13. The beamsplitter of claim 12 wherein said first and second prisms are made of ZnSe, each of said first and second anti-reflection layers is a triad of sub-layers comprising ZnS, ZnSe and ZnS in succession, said first layer of each of said pairs of thin-film layers in said stack is a triad of sub-layers comprising Te, ZnSe and Te in succession, and said second layer of each of said pairs of thin-film layers in said stack is made of ZnSe.

14. The beamsplitter of claim 12 wherein each of said first and second prisms is substantially a 45° prism, said coating is formed on the hypotenuse of said first prism, and the surface of said second prism that is bonded to said coating is the hypotenuse of said second prism.

15. A polarizing beamsplitter for separating s and p components of an infrared beam, said beamsplitter comprising a first prism, a coating on a surface of said first prism, and a second prism, a surface of said second prism being bonded to said coating, said first and second prisms being made of the same material, said coating comprising a plurality of thin-film layers, each of said thin-film layers being made of one of only three different materials, one of said three different coating materials being the same material from which said first and second prisms are made.

16. The beamsplitter of claim 15 wherein each of said first and second prisms is substantially a 45° prism, said coating being formed on the hypotenuse of said first prism, said surface of said second prism that is bonded to said coating being the hypotenuse of said second prism.

17. The beamsplitter of claim 15 wherein said surface of said second prism is bonded to said coating by optically polished contact.

18. The beamsplitter of claim 15 wherein said coating comprises a first layer of relatively high refractive index and a second layer of relatively low refractive index, the refractive indices of said first and second layers being related to each other so that the p component of said beam is substantially undeviated and unreflected in passing through said coating.

19. The beamsplitter of claim 18 wherein one of said first and second layers of said coating is an equivalent layer consisting of a triad of sub-layers, said equivalent layer having an equivalent refractive index related to the refractive index of the other of said first and second layers so that the p component of said beam is substantially undeviated and unreflected in passing through said coating.

20. The beamsplitter of claim 19 wherein said coating comprises a number of pairs of said first and second layers, and said pairs of said first and second layers being formed into a stack, the number of said pairs of said first and second layers in said stack being sufficient to cause reflection of a detectable amount of the s component of said beam.

21. The beamsplitter of claim 20 wherein said coating further comprises a first anti-reflection layer formed on said surface of said first prism, the first layer of an initial pair of said layers in said stack being deposited upon said first anti-reflection layer.

22. The beamsplitter of claim 21 wherein said coating further comprises a second anti-reflection layer, said second anti-reflection layer being formed on the second layer of a final pair of said layers in said stack.

23. The beamsplitter of claim 22 wherein each of said first and second anti-reflection layers is an equivalent layer consisting of a triad of sub-layers, said equivalent layer having an equivalent refractive index that is related to the refractive indices of said first prism and of said equivalent layer of said one of said first and second layers in said stack so that reflection of the p component of said beam is minimized.

24. The beamsplitter of claim 23 wherein said coating further comprises a layer of prism material deposited upon said second anti-reflection layer, said layer of prism material being optically polished, and wherein said surface of said second prism is also optically polished, said surface of said second prism being bonded to said coating by being pressed into contact with said optically polished layer of prism material.

25. The beamsplitter of claim 24 wherein said first and second prisms are made of ZnSe, each of said first and second anti-reflection layers is a triad of sub-layers coprising ZnS, ZnSe and ZnS in succession, said first layer of each of said pairs of thin-film layers in said stack is a triad of sub-layers comprising Te, ZnSe and Te in succession, and said second layer of each of said pairs of thin-film layers in said stack is made of ZnSe.

* * * * *